July 7, 1925.

C. ST. C. GRAHAM

OUTLET FIXTURE FOR ELECTRICAL WORK

Filed Sept. 23, 1924

Inventor
C. S. Graham,
By Shepherd & Campbell
Attorneys

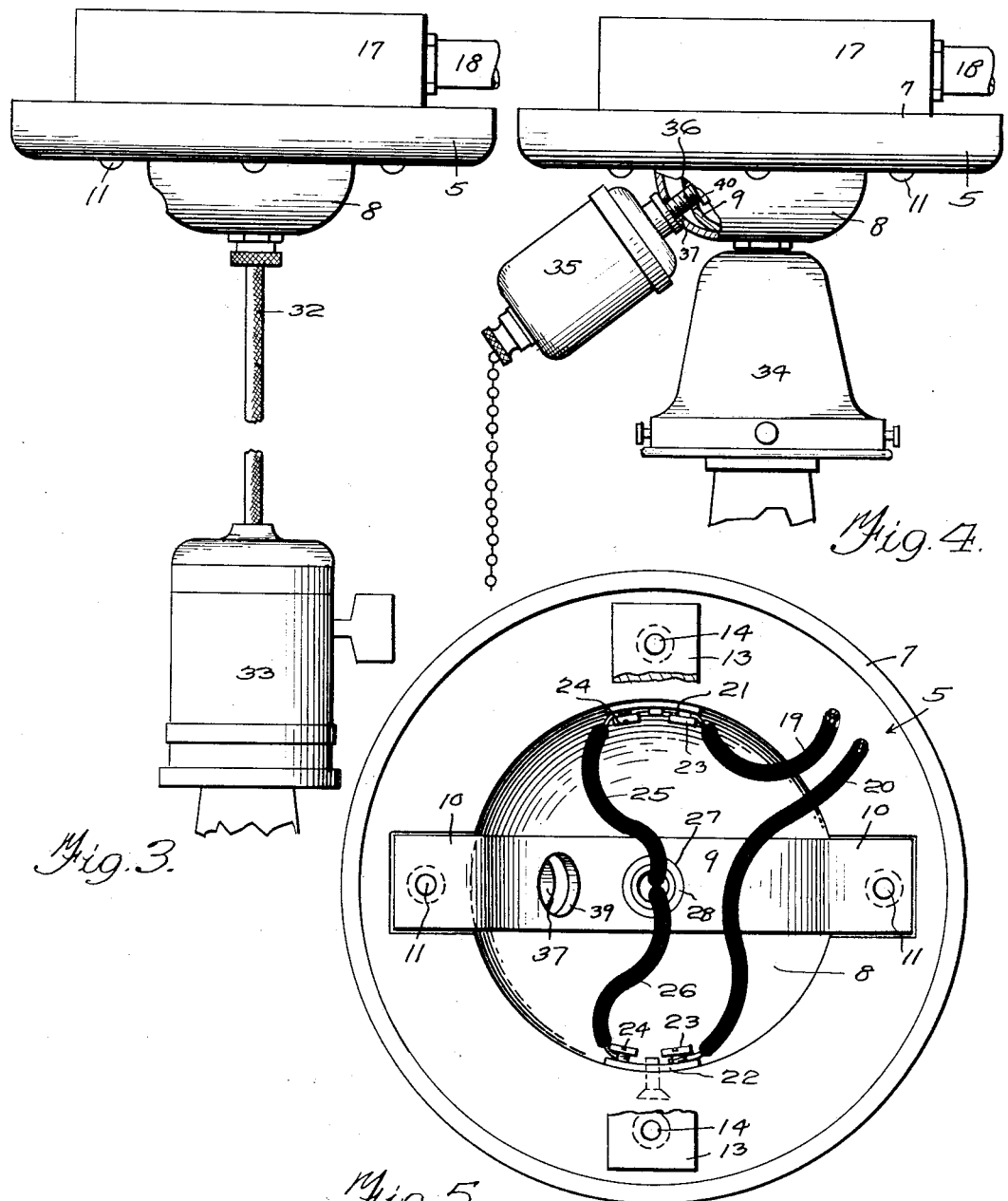

Patented July 7, 1925.

1,544,736

UNITED STATES PATENT OFFICE.

CECIL ST. CLAIR GRAHAM, OF JACKSONVILLE, FLORIDA.

OUTLET FIXTURE FOR ELECTRICAL WORK.

Application filed September 23, 1924. Serial No. 739,399.

*To all whom it may concern:*

Be it known that I, CECIL S. GRAHAM, a citizen of the United States, residing at Jacksonville, in the county of Duval and State of Florida, have invented certain new and useful Improvements in Outlet Fixtures for Electrical Work, of which the following is a specification, reference being had therein to the accompanying drawings.

This invention relates to an outlet fixture for electrical work. It is primarily designed to serve as a cover for an outlet box of conventional design, though it is not limited to such use but may be used without the outlet box as will be hereinafter set forth.

By the use of this device, the necessity for making soldered joints in the outlet boxes is eliminated. Furthermore the device of the present invention serves as an insulator and renders unnecessary the use of an insulating joint.

Furthermore the structure of the present invention is such as to provide a multiple purpose outlet, in that it may be used as a hanger and base for any type of fixture of standard type size; as a hanger and base for a chain pendant; as a rosette for drop cords; as a ceiling fixture, when equipped with a standard socket, socket cover or shade holder, and as a canopy insulator if it is desired to employ canopies, though the use of the device does away with the necessity of using a fixture canopy. This device may be used as a base for either ceiling or bracket fixtures on any type of concealed outlet and is intended to replace the present fittings designed for concealed knob and tube work, without outlet boxes. The 1923 National Electrical Code requires the use of outlet boxes on all concealed knob and tube outlets as well as in conduit or armored cable work.

Further objects and advantages of the invention will be set forth in the detailed description which follows:

In the accompanying drawings:

Figure 3 is a side elevation illustrating the structure of the invention utilized as a rosette for a drop cord.

Figure 4 is a side elevation illustrating the use of the device of the invention as a ceiling fixture, and supporting a pull chain switch, and Figure 5 is a plan view, with one of the bridges broken away, illustrating the manner of connecting the wires.

Like numerals designate corresponding parts in all of the figures of the drawing.

Figures 1, 2:
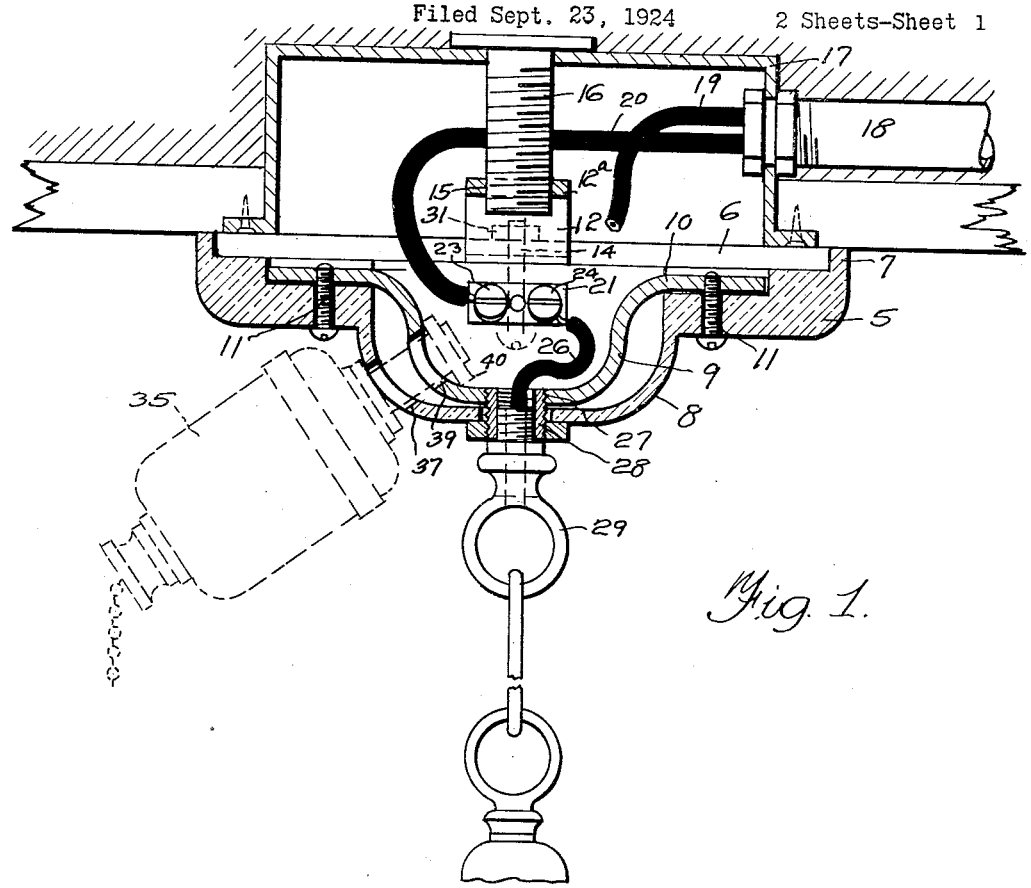
Figure 1 is a vertical sectional view through an outlet box and the fixture of the present invention showing the same utilized to support a chain pendant and illustrating how a pull chain switch of conventional construction may be utilized in conjunction therewith.
Figure 2 is a perspective view of the device.

In the drawing, 5 designates a preferably circular base of porcelain or any other suitable insulating material. This base is recessed at 6 to provide an upstanding rim 7. The base is also provided with an outwardly bowed portion or dome 8, the interior of which receives the bowed portion 9 of a bridge 10, said bridge being secured to the base by suitable screws or other fastening devices 11. It should be particularly noted that the bridge is countersunk in the base 5, to guard against the possibility of its coming in contact with an edge of the outlet box or any other grounded object. A second bridge 12 is upwardly or outwardly bowed as indicated 12$^a$ and its ends 13 are secured to the base 5 by screws or other suitable fastening devices 14. The bowed portion 12 of the last named bridge is provided with an internally threaded opening 15 which is adapted to screw upon the fixture stud 16, of a conventional outlet box 17. The conduit leading into this box is indicated at 18 and the wires leading through the conduit are indicated at 19 and 20. Suitable metallic connections 21 and 22 are secured to the base 5 of insulating material and these connections each carry a pair of screws 23 and 24 which constitute binding posts. These connections 21 and 22 serve to connect the wires 19 and 20 with the wires 25 and 26 which lead to the fixture that it is desired to supply with current. Thus the necessity of making soldered joints in the interior of the outlet box is avoided. It is manifest that this will result in a very great saving of time and, consequently, money.

Furthermore it will eliminate one of the most tedious and disagreeable features of electrical work.

The bowed portion 9 of the bridge 10 is provided with an internally threaded opening 28 which receives an internally and externally threaded bushing 28 in which may be threaded any type of standard fixture.

In Figure 1, I have indicated a conventional pendant fixture 29 as engaged with the bushing 28, but it is manifest that any suitable type of fixture may be screwed therein, such, for example, as an ordinary pipe fixture.

If an ordinary pipe fixture be employed with a sliding canopy thereon, the upper edge of the canopy could rest against the base 5, in which case the base would serve as an insulator for the canopy.

While I have shown the device of the invention as being screwed upon the fixture stud 16 I may support the same by the screws 14 engaging the usual ears 31 of the outlet box 17, these being the ears usually employed for receiving the cover holding screws. The engagement of the screws with the box lugs may be either in conjunction with the stud 16 or independently thereof.

In Figure 3, I have shown the device of the present invention employed as a rosette for a drop cord outlet, the drop cord being indicated at 32 and the socket to which it is connected being indicated at 33. In Figure 4, I have illustrated the device of the present invention employed as a support for a ceiling fixture, such fixture with its shade supporting canopy being indicated at 34. In either of the arrangements described, a pull chain switch 35 of conventional design may be supported in operative relation to the structure by means of a nipple 36 which projects through an opening 37 formed in the dome of the base 5 and through a second opening 39 formed in bridge 9 and is engaged inwardly of said bridge by a lock nut 40. Thus the bridge takes the strain off of the porcelain base 5, during the operation of the pull chain switch. When the switch is not used the opening 37 may be closed by a plug of suitable sealing material such as porcelain or wax.

The two bridges are preferably made of stamped steel or cast iron, while the base is to be made of porcelain, though it is to be understood that any suitable insulating material such as hard rubber, fiber or the like, comes within the scope of my invention. The presence of the rim 7 insures that the device will be self-leveling in case the outlet box is not true with the outer face of the wall or projects therebeyond.

It is to be understood that the invention is not limited to the precise construction set forth but that it includes within its purview whatever changes fairly come within either the terms or the spirit of the appended claims.

Having described my invention what I claim is:

1. The combination with a base of insulating material, having an outwardly bowed central portion, of a bridge, having a bowed central portion extending into the bowed portion of the base, a fixture carrying element carried by said bridge, a second bridge bowed in the opposite direction and having a portion adapted to engage the fixture stud of an outlet box and metallic connectors carried by said base, adapted to connect the feed wires to the wires of a fixture.

2. A structure as recited in claim 1, in combination with means for mounting a conventional pull chain switch, upon said base.

3. A structure as recited in claim 1, in combination with a pull chain socket, a nipple upon which said socket is mounted, there being openings formed in the base and in the first named bridge through which said nipple passes, and means for binding said nipple to the first named bridge.

4. The combination with a base of insulating material, of such amplitude as to completely span the open side of an outlet box, said base comprising an outwardly bowed central portion, of a bridge, having a bowed central portion extending into the bowed portion of the base, a fixture carrying element extending through the bowed portion of the base, and having screw threaded engagement with the central portion of said bridge, a second bridge bowed in the opposite direction and comprising a portion adapted to have threaded engagement with the usual threaded fixture stud of an outlet box, metallic connectors carried by said base, adapted to connect the feed wires to the wires of a fixture, and means for securing the base to the usual cover engaging lugs of an outlet box.

5. A cover for an outlet box comprising a base of insulating material of such amplitude as to span such a box, said base being bridged by two metallic members which are secured to said base and electrically insulated from each other by the material of said base, one of said members having an internally threaded portion adapted to engage the usual fixture stud of an outlet box and the other of said members having a portion threaded for engagement with a lighting fixture support.

6. A structure as recited in claim 5 in combination with metallic mid-wire connectors mounted upon and insulated by the material of the base and serving to connect the service wires to fixture wires.

In testimony whereof I hereunto affix my signature.

CECIL ST. CLAIR GRAHAM.